Jan. 5, 1926. 1,568,387
G. E. WEAVER
AUTOMOBILE ELEVATING RUNWAY
Filed May 16, 1925
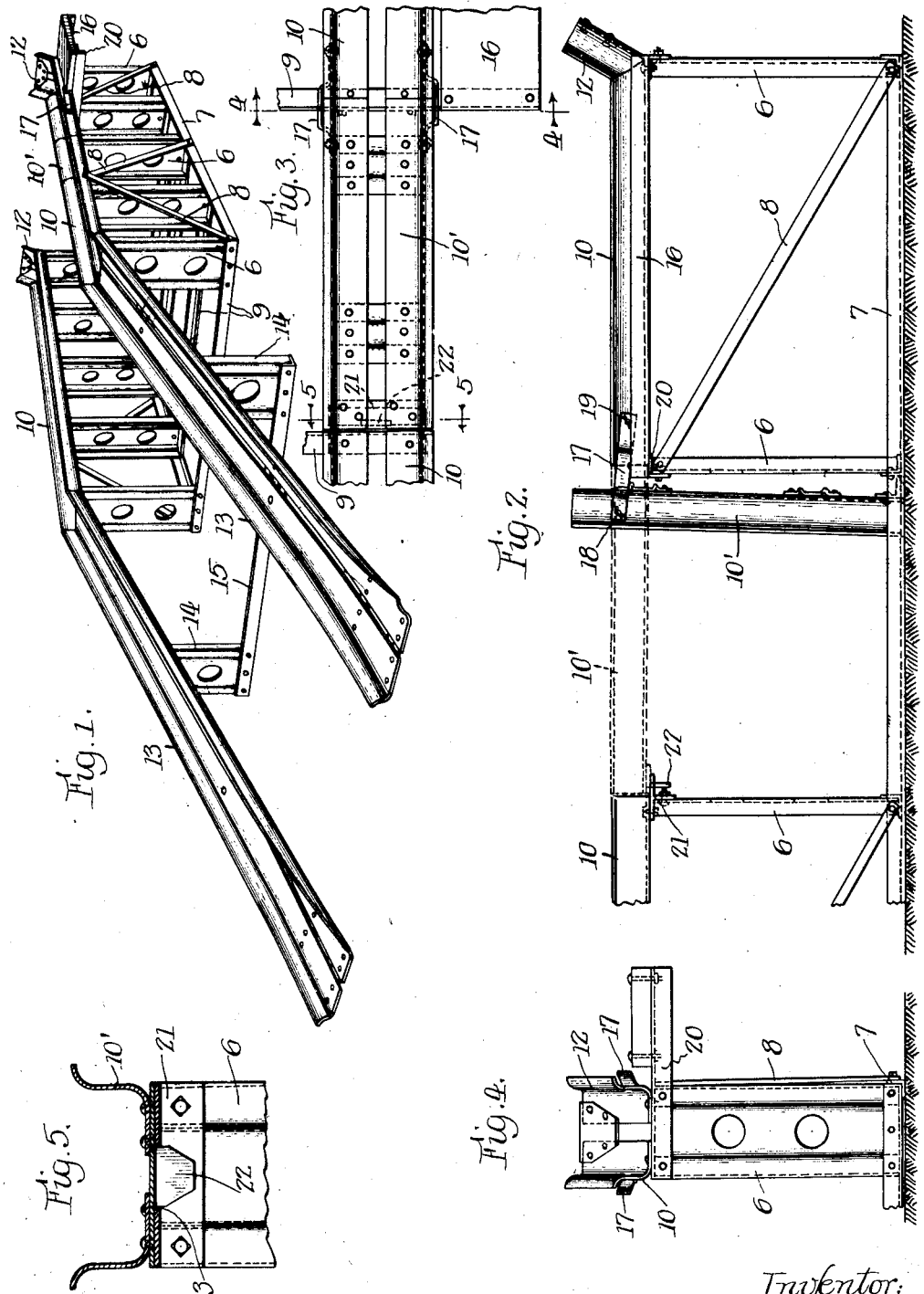
Witness:
A. J. Sauser
Inventor:
Garland E. Weaver
By Walter M. Fuller Atty.

Patented Jan. 5, 1926.

1,568,387

UNITED STATES PATENT OFFICE.

GAILARD E. WEAVER, OF SPRINGFIELD, ILLINOIS, ASSIGNOR TO WEAVER MANUFACTURING COMPANY, OF SPRINGFIELD, ILLINOIS, A CORPORATION OF ILLINOIS.

AUTOMOBILE ELEVATING RUNWAY.

Application filed May 16, 1925. Serial No. 30,683.

*To all whom it may concern:*

Be it known that I, GAILARD E. WEAVER, a citizen of the United States, residing at Springfield, in the county of Sangamon and State of Illinois, have invented certain new and useful Improvements in Automobile Elevating Runways, of which the following is a specification.

This invention relates to a class of devices commonly known as automobile elevating runways, the purpose of which is to raise an automobile above the level of the floor or ground so that the under side of the car may be made conveniently accessible to a mechanic for performing any necessary work, cleaning the underlying parts, draining the crank case, etc. Runways of this character commonly consist of a horizontal frame structure supported on the floor or ground and carrying a pair of horizontal elevated track rails, a pair of inclined track rails leading from the floor or ground up to one end of the elevated track rails, and stops at the other end of the horizontal track rails to prevent the car from running off the structure.

The track rail supporting elements of these devices commonly consist of uprights on which the track rails rest and oblique braces between the uprights; and furthermore, where these devices are located in garages or other buildings it is common, in order to conserve space, to locate the front end against or closely adjacent to a wall of the building, while the rear end is more or less obstructed by the inclined approach tracks or runways; so that it is sometimes a difficult and awkward task for the mechanic or workman to get in and out of working position beneath the car.

The main object of the present invention is to improve devices of this character in the way of providing ready access to the interior of the structure and without requiring the workman to crawl into it from either end; and to the attainment of this object, the invention consists substantially in providing a gate in either or both sides of the structure that may be readily opened, after the automobile is in place, to afford easy entrance. This gate preferably takes the form of a hinged section of the horizontal trackway, with means for securely supporting the same in working position when the car is run onto and off the structure. Another object is to provide a structure including such hinged section of the trackway that shall be so locked in working position that it will co-operate with the uprights and braces of the structure to distribute throughout the entire side of the structure any longitudinal strain on the latter that might be caused by the automobile bumping the end stops with more or less force. A still further object is to provide a very simple and easily manipulated hinged track section functioning in the manner of a gate which, when open, will automatically function as a stop to arrest any back movement of the automobile while the gate is open, thus making it impossible for the automobile to be accidentally derailed on the structure.

Still other objects and attendant advantages of the invention will be apparent to persons familiar with this class of devices from the following detailed description, taken in connection with the accompanying drawings wherein I have illustrated one practical and approved embodiment of the principle of the invention, and in which—

Fig. 1 is a perspective elevation of an automobile elevating runway equipped with my present improvement;

Fig. 2 is an enlarged side elevation of the front portion thereof including my improved gate;

Fig. 3 is a top plan view of the gate portion of the structure showing the gate in closed and locked position;

Fig. 4 is a cross-section on the line 4—4 of Fig. 3; and

Fig. 5 is an enlarged cross-section showing the gate locking device, on the line 5—5 of Fig. 3.

Referring to the drawing, the runway herein shown comprises a frame structure fabricated from standard steel parts including parallel rows of uprights or posts 6, angles 7 connecting their lower ends and diagonal braces 8; the posts in the two rows being rigidly connected and spaced by transverse angles 9. Secured to and supported on the posts 6 are horizontal trough-shaped trackways or rails 10, to the forward ends of which are welded or otherwise secured short upwardly inclined sections 12 constituting bumpers or stops for the front wheels of the car. 13 designates the inclined approach trackways or rails, the lower ends of which rest upon the floor or ground and the upper ends of which are supported upon the end posts 6 of the main structure in register with the rear ends of the track rails 10. The approach rails 13 are supported by one or more intermediate posts 14 connected and spaced by the angle bar 15. On one or both sides of the main structure at substantially the level of the track rails 10 is a platform 16 on which the workman may stand when examining the engine and its accessories beneath the engine hood.

The structure as thus far described is old and well known and no novelty is claimed therefor. As hereinabove stated, the presence of the track rails 10 and the brace bars 8 makes it a matter of some difficulty for the mechanic or workman to enter the structure and get beneath the car from the sides; and if he enters it from the forward end, the structure must be spaced sufficiently from a wall or fence to enable him to gain access in that way, while in order to enter from the front, he must either crawl under the approach track rails 13, which are usually of considerable length, or walk entirely around the lower end of the latter.

It is with a view to saving both space and time that I have designed my present improvement which, as already indicated, consists essentially in the provision of a gate in one or both sides of the structure which can be opened after the car is in place and then closed to permit the car to back off.

This gate, in form of the invention herein illustrated, consists of a hinged section 10′ of one of the horizontal track rails 10. This section 10′ is connected to the portion of the track rail just forwardly thereof by a pair of links 17, conveniently made of strap iron, that are pivoted to the sides of the gate section 10′ at 18 somewhat rearwardly of the forward end of said gate section, and are similarly pivoted to the rear portion of the track rail 10 at 19 about the same distance forwardly of its rear end. Directly underlying the joint between these two rail sections and adapted to support the meeting ends thereof is an angle bar 20 which is itself rested on the upper end of one of the posts 6 and may be extended to form one of the supports for the platform 16. The other end of the track rail section 10′ and the adjacent end of the fixed track rail 10 are supported upon a short section of T-rail 21 that is rested upon another post 6. By reason of this construction the gate section 10′ of the rail, when lined up with the adjacent permanent sections, is amply supported at both ends for the passage of the front wheel of the automobile thereover. When the automobile is in place, the section 10′, lying between the front and rear wheels, is slightly raised and then allowed to drop to the substantially upright position shown by full lines in Fig. 2, wherein its lower end rests upon the floor, while its upper end extends slightly above the level of the adjacent rail section 10; and, being securely tied to the latter by the hinge straps 17, constitutes an effective stop to block any rearward rolling of the front wheel of the automobile. When the gate section 10′ is thus opened, a free opening through the side of the runway structure is provided between the floor and the running board of the car, through which the mechanic or workman easily enters to the space within the structure beneath the car.

When, as often happens, the car is not arrested by the tracks until the front wheels have struck the forward stops 12, the thrust on the latter imparts some strain to the longitudinal side frames of the runway; and the severance of the track rail to provide the gate would throw these strains wholly on the two forward posts 6 and the oblique brace 8 between them. To prevent this, and distribute such strains throughout the full length of the side frame of the runway, I provide a simple lock which connects the gate section 10′ with the track section 10 directly in rear thereof. As herein shown, this lock consists simply of a depending lug 22 on the under side of the free end of the gate section 10′ which, as clearly shown in Fig. 5, passes through a slot 23 formed in the forward leaf of the T-support 21. By this means the longitudinal stresses referred to are transmitted through the hinge straps 17, and the gate section 10′ to the rear portion of the frame. This lock serves the further function of maintaining the free end of the gate section always in accurate alinement with the rear rail section 10. There is sufficient looseness of fit in the hinge joints 18 and 19 to allow the rear end of the gate section 10′ to be raised sufficiently to clear the locking lug 22 from the slot 23, whereupon by raising the opposite end of the gate section, the latter is easily swung downwardly to the upright full line position shown in Fig. 2, thus providing a clear and unobstructed access to the space beneath the car. The lock 22 also prevents any tendency of the frame to divide or pull apart at this point, which might allow the gate to drop and cause an accident.

It will be observed by reference to Fig. 2 that the movable gate section 10′ is of a length somewhat exceeding the height of the fixed track rail sections 10; so that, when it is lowered to open position its upper end projects above the forward fixed track rail section 10 and constitutes a stop, functionally similar to the stop 12, to arrest any accidental backward rolling of the automobile.

I have herein shown and described one very simple and practical form of the invention as embodied in a metal frame runway of the character shown. Manifestly many of the structural details may be varied to suit other forms and structures of runways, and hence I do not limit the invention to the precise form disclosed, but reserve all such variations and modifications as fall within the spirit and purview of the appended claim.

I claim—

An automobile runway of the character described, having a pair of spaced frame supports in one side thereof, fixed track rail sections mounted on said frame supports, a movable track rail section between said fixed sections of a length exceeding the height of said fixed sections, ledges on said frame supports on which the ends of said movable section normally rest in register with the ends of said fixed sections, and a link horizontally pivoted to and connecting proximate ends of said movable section and one of said fixed sections and permitting said movable section to be swung downwardly through the space between said frame supports to a substantially vertical position wherein the hinged upper end of said movable section projects above the adjacent fixed section and constitutes a stop to arrest backward movement of the automobile on the runway.

In witness whereof I have hereunto set my hand and seal.

GAILARD E. WEAVER. [L. S.]